United States Patent

Tyutinman

[11] Patent Number: 5,316,363
[45] Date of Patent: May 31, 1994

[54] AUTOMOBILE WINDOW SHADE SYSTEM

[76] Inventor: Adolf Tyutinman, 2983 Cambridge Dr., San Jose, Calif. 95125

[21] Appl. No.: 933,392

[22] Filed: Aug. 21, 1992

[51] Int. Cl.$^5$ .............................................. B60J 1/20
[52] U.S. Cl. .................................. 296/138; 296/140; 296/141; 296/97.4; 160/120; 160/241
[58] Field of Search ............... 296/138, 140, 141, 143, 296/97.4, 97.8; 160/120, 239–241, 123, 126, 319, 321, 370.2 A

[56] References Cited

U.S. PATENT DOCUMENTS

| | | | |
|---|---|---|---|
| 1,530,068 | 3/1925 | Abrott | 160/126 |
| 1,616,294 | 2/1927 | Yost et al. | 296/138 |
| 3,429,298 | 2/1969 | Thomason | 160/265 X |
| 3,861,738 | 1/1975 | Whitney | 296/138 |
| 4,174,134 | 11/1979 | Mathis | 296/143 X |
| 4,363,513 | 12/1982 | Sahar | 296/140 |
| 4,944,548 | 7/1990 | Payne et al. | 296/97.8 |
| 5,064,238 | 11/1991 | Mohtasham | 296/97.6 |
| 5,085,473 | 2/1992 | Yang | 296/141 |

FOREIGN PATENT DOCUMENTS 367945  3/1932  United Kingdom ............... 160/319

*Primary Examiner*—Dennis H. Pedder
*Attorney, Agent, or Firm*—D. Pressman

[57] ABSTRACT

An automobile window shade system comprising a frame (20) formed of horizontal tubular elements (20a through 20c) and vertical tubular elements (22e through 22f) interconnected by T-shaped connectors (24a through 24f). The frame is installed inside the automobile body and contains a cord (42) guided through a plurality of guiding means (64, 66, and 68). Two adjacent shades (94 and 96) which are made of a light-impermeable flexible material are attached to a yoke (84). One end of the yoke is located inside the vertical tubular element (22e through 22f) between two stops (88 and 90) which are rigidly attached the cord. The cord is also connected to a handle (110). When the handle (110) is moved in the window shading direction, it moves the cord (42) and hence the stops (88 and 90). When the upper stop (88) comes into contact with the yoke (84) it moves the yoke and the shields (94 and 96) down, thus shading the windows. An embodiment with a beaded thread (128) and the expandable spring-loaded C-shaped portion of the yoke makes it possible to shield and unshield windows selectively. A motorized version with a drive motor (150) provides mechanized shading and unshading. For this purpose, a portion of the cord comprises a roller chain (156) which is in mesh with a sprocket (154) attached to the output shaft of motor (150). The system may be hidden under the panels of the car interior or attached directly to the outer surface of the panels.

8 Claims, 9 Drawing Sheets

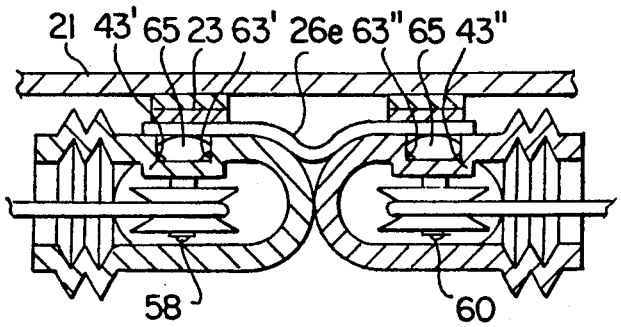
FIG. 3
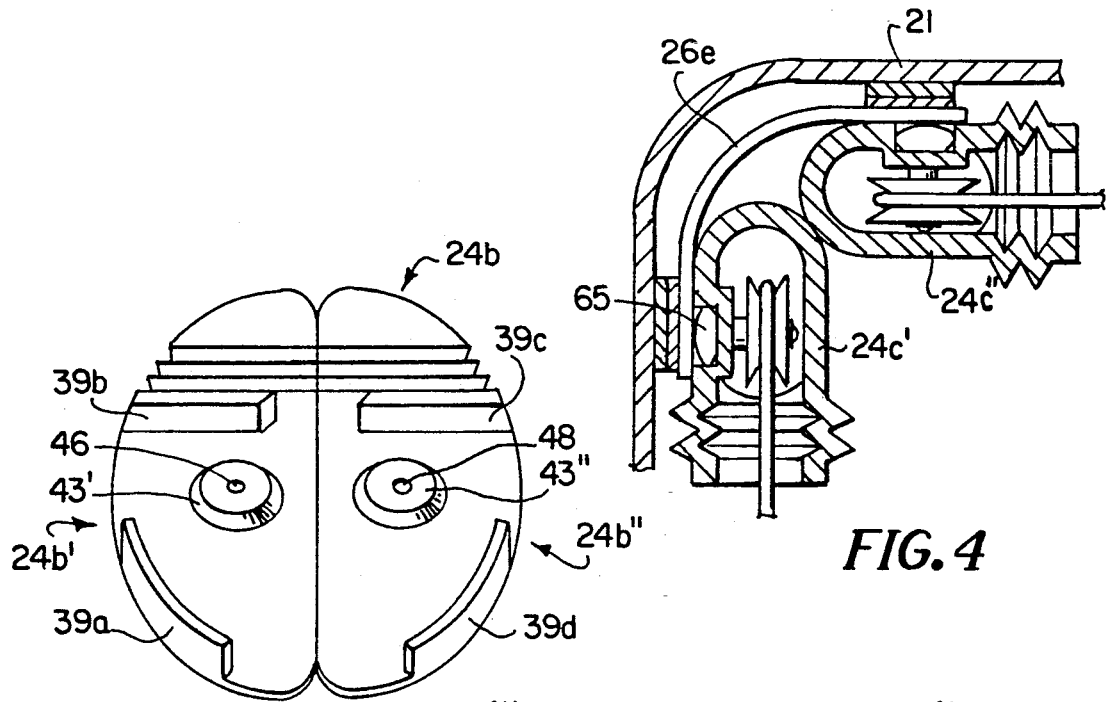
FIG. 5
FIG. 4
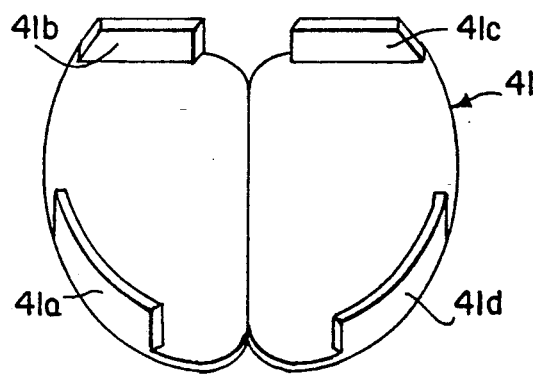
FIG. 6

AUTOMOBILE WINDOW SHADE SYSTEM

BACKGROUND

1. Field of the Invention

The present invention relates to automobile window shades, particularly to an automobile window shade system capable of shading all windows of an automobile simultaneously.

2. Description of Prior Art

The interior of a vehicle parked outdoors in the summer sun can become extremely warm and uncomfortable for its occupants. Moreover, direct sunlight damages the upholstery, dashboards, steering wheels, seats, and other parts of the automobile interior, causing them to fade, dry out, or crack. Therefore, various window shading devices are used to protect automobile interiors from the damaging action of direct sunlight.

One of the most popular and simple types of window shading devices is an accordion-folded window blind. Such blinds, which are produced, e.g., by Auto-Shade Inc., North Hollywood, California, are made of cardboard, can be folded and unfolded, and can be stored in the trunk of an automobile. However, these blinds are designed specifically for shading only the portion of the automobile under the windshield. For this purpose these blinds have a special cutout for rearview mirrors. Furthermore, folding and unfolding the blends takes time. Besides, the cardboard can be quickly damaged and must be often replaced. During the time of the day, the sun changes position with respect to the automobile, so that its rays penetrate the automobile through unprotected side-door windows. Although the window blinds are adjustable in the horizontal direction, they have a fixed vertical dimension, which makes them inconvenient for use in automobiles of some models.

U.S. Pat. No. 4,944,548 issued Jul. 31, 1990 to G. Payne et al. discloses a side window shade for automobiles. The shade is formed of a plurality of pivotally connected sections which form a panel. An upper edge of the panel is configured with a curvature corresponding to an automobile side window frame and includes a plurality of spaced notches which receive suction cup retainers for insertion of suction cups attachable to an automobile side window. The device of this type also protects only side-window portion of the automobile interior. The device must be removed for driving and reinstalled for parking in a sunny place every time. Therefore it is inconvenient in use. Moreover, suction cups can be easily damaged because of frequent connection and disconnection. Since the suction cups are subject to direct sunlight, their material quickly looses elasticity, making the suction cups unsuitable for further application.

U.S. Pat. No. 5,064,238 issued Nov. 12, 1991 to Mauni Mohtasham describes a windshield sunshade assembly for mounting on the pivoted connector portion of the sun visor attachment of a automobile so that a shade member, which is wound into a roll, can be unwound and retracted or extended in order to cover the windshield from inside of the automobile. This device has the same disadvantages as other conventional automobile-interior shading means, i.e., it shields only the automobile interior under the windshield and does not protect the rest of the interior.

Even in the case all automobile windows are shaded separately by using conventional devices described above, it would be necessary to close and open each window shade separately which would be an inconvenient and time-consuming operation.

OBJECTS AND ADVANTAGES OF THE INVENTION

It is therefore an object of the invention to eliminate the above disadvantages and to provide an automobile window shade system which protects the entire automobile interior from direct sunlight, which makes it possible to shield and unshield all automobile windows simultaneously with a single operation, which is adjustable in a vertical direction, and which is durable and has a long service life. Another object is to provide a shading system capable of selectively shading or unshading separate automobile windows. Other advantages and features of the invention will become apparent from a consideration of the ensuing description and drawings.

BRIEF DESCRIPTION OF DRAWINGS

FIG. 3 is a top view of a connector for an intermediate column used in such system.

FIG. 4 is a top view of a corner connector for a corner column of the frame.

FIG. 5 is a front view of a T-shaped connector used in the frame and shown in an open state and prior to assembling.

FIG. 6 is a view of a cover for a T-shaped connector of FIG. 5.

DETAILED DESCRIPTION OF THE APPARATUS OF THE INVENTION

FIGS. 1–4—Description of Frame

Figure 1:
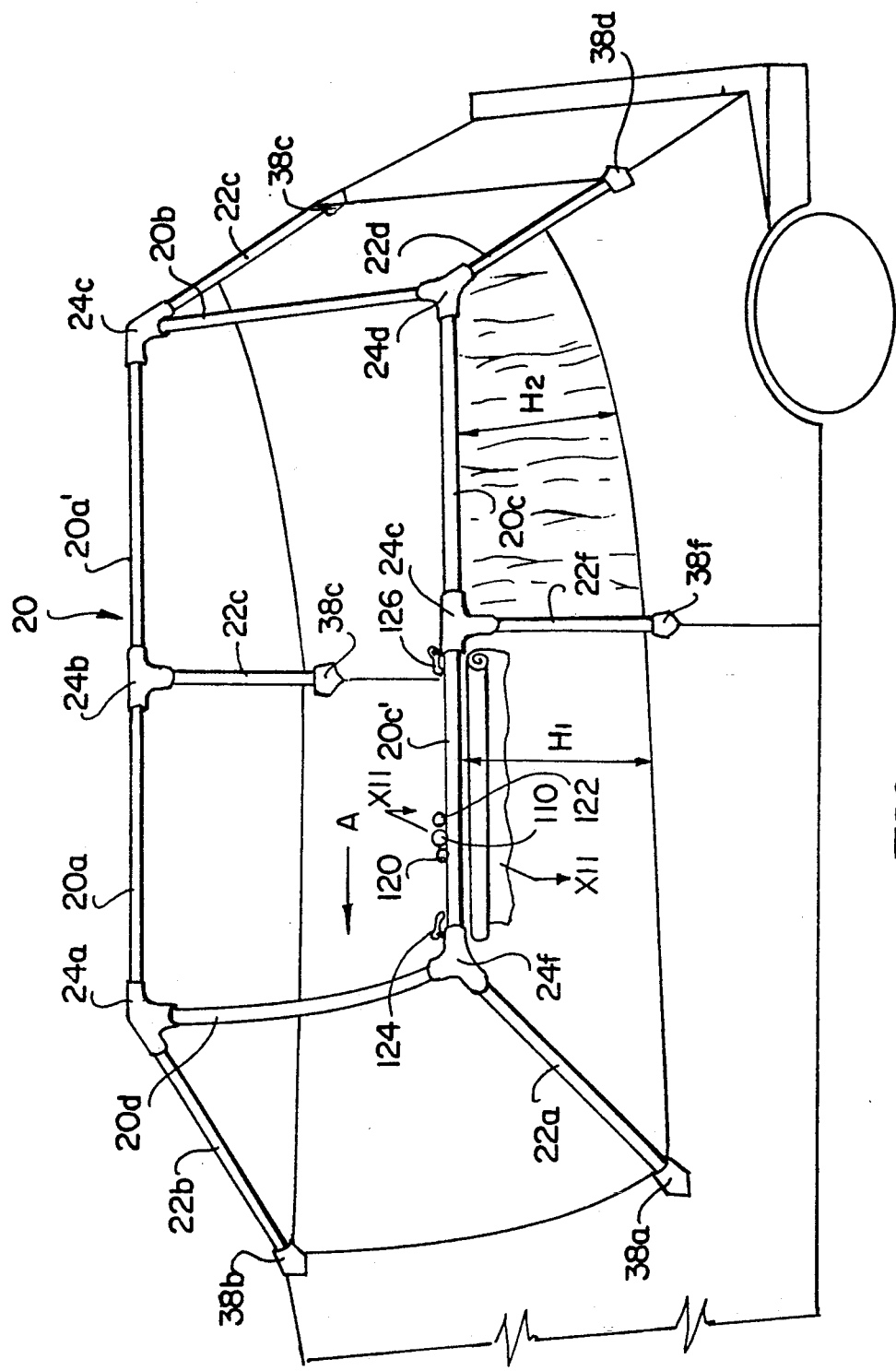
FIG. 1 is a top three-dimensional view of a window shade system of the invention within the outlines of an automobile shown by phantom lines.

A general view of a system of the invention is shown in FIG. 1, which is a top three-dimensional view illustrating positions of the elements of the system inside an automobile, outlines of which are shown by phantom lines.

The system consists of a rectangular frame 20 composed of horizontal tubular elements 20a, 20a', 20b, 20c, 20c', and 20d and a number of vertical struts or columns 22e through 22f connected to frame 20. In the context of the present invention, the term "vertical" covers substantially vertical or slightly inclined columns of the automobile body. Six vertical columns are shown in the illustrated embodiment, although their number may be different.

Frame 20 is installed inside an automobile body having windows (not shown) of different heights, including a window of a smallest height and a window of a greatest height. Each window has an upper side and a lower side. Horizontal tubular elements of frame 20 are aligned with or located above the above-mentioned upper sides of the windows.

Figure 2:
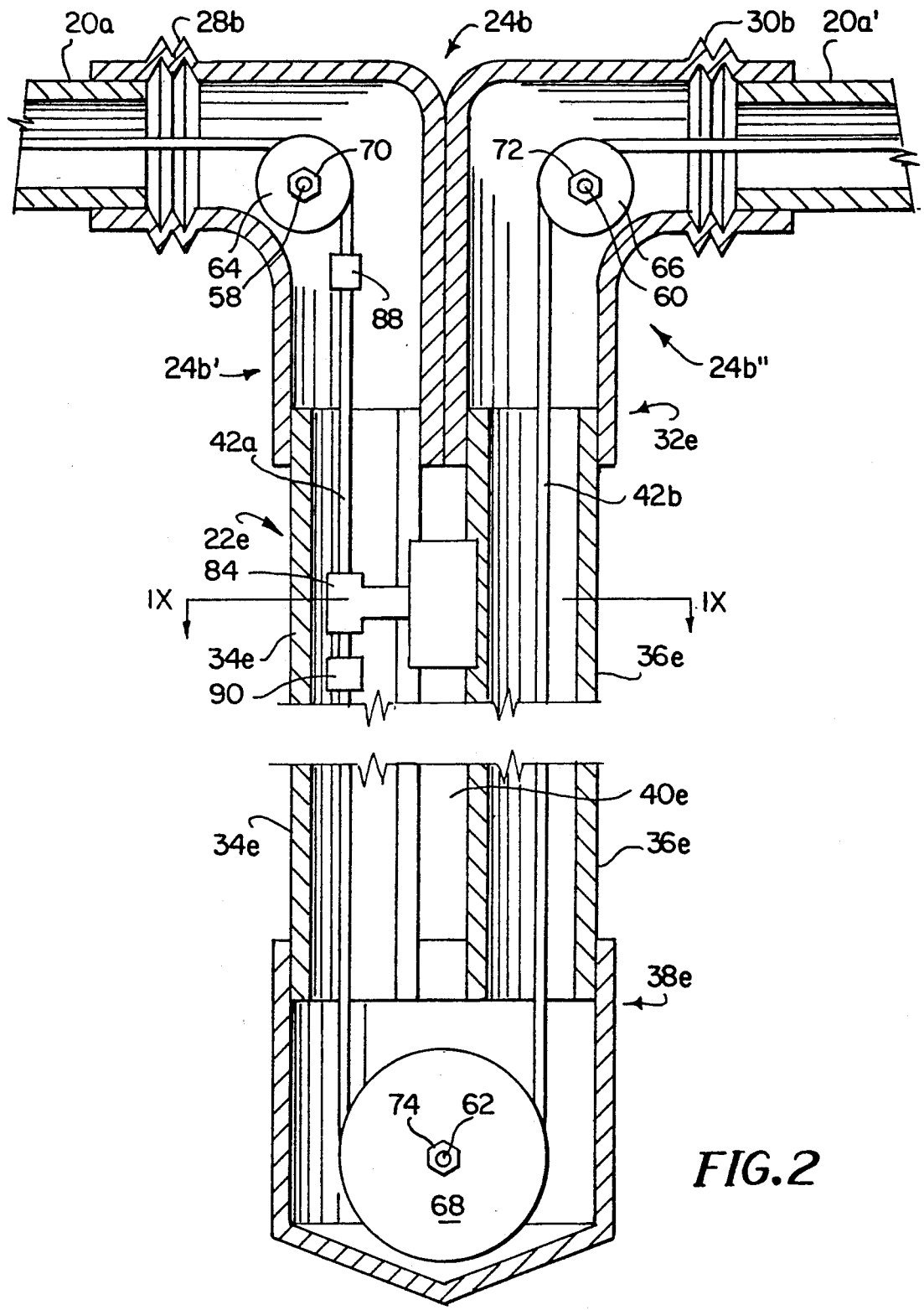
FIG. 2 is a side view of an intermediate vertical column in the system with details of a cord guiding mechanism and its attachment to horizontal tubular elements of the frame of such system.

The tubular frame elements are interconnected through T-shaped connection elements 24a through 24f. It is understood that the amount of T-shaped connectors will depend on the amount of vertical columns 22e to 22f. A more detailed structure of a typical T-shape connector of the type located in the corners of frame 20, i.e., of one of connectors 24a, 24c, 24d, and 24f, is shown in FIG. 2 and 3. FIG. 2 is a side view of a column, 22e which is connected to horizontal elements 20a and 20a' (FIG. 1). All six connectors are identical. Therefore only one of them, i.e., 24e, will be described in detail below.

As shown in FIG. 2 and in FIG. 3, which is a top view of connector 24b, this connector consists of two parts 24b' and 24b". Both parts 24b' and 24b" have rounded facing ends which are in contact with each other so that parts 24' and 24" can be turned with respect to each other while remaining in contact. Both parts are kept together by means of a flexible strap 26e and are attached to an interior 21 of an automobile body, e.g., by adhesive 23 (FIG. 3).

Each connector part 24b' and 24b" has a flexible coupling end 28b or 30b, respectively. Flexible coupling ends 28b and 30b are designed for flexibly interconnecting two adjacent horizontal tubular elements 20a and 20a' Flexible coupling ends 28b and 30b may be made, e.g., in the form of bellows, as shown in the attached drawings. This means that horizontal tubular elements 320a and 20a' interconnected through T-shaped connector 24b may be slightly tilted with respect to each other and deviated from a straight-line extension of one another. In other words, the horizontal elements of the frame may conform to an actual curvilinear configuration of the base of the automobile roof (not shown).

Vertical column 22e is inserted into the lower end 32e of coupling 24b. Since vertical column 22e is always arranged vertically, the lower coupling end 32b does not need flexibility.

As all vertical columns are identical, only one of them, i.e., 22e, will be described in detail. Vertical column 22e consists of two parallel tubes 34e and 36e. The upper ends of tubes 34e and 36e are inserted into lower coupling end 32e of T-shaped connector 24b, more specifically, into lower ends of respective parts 24b' and 24b".

The lower ends of tubes 34e and 36e are inserted into a foot 38e which keeps the lower ends of tubes 34e and 36e together and also serves for attaching the lower ends of vertical column 22e to an element of an automobile body (not shown). It can be attached by means of an adhesive, or hook-and-loop fasteners. Tubes 34e and 36e have a space 40e between each other for the purpose explained later.

Intermediate vertical column 22e and intermediate T-shaped connector 24b which connects two horizontal tubular elements 20a and 20a' are arranged almost on the same straight line. T-shaped connectors 24a, 24c, 24d, and 24f and their respective vertical columns 22b, 22c, 22d, and 22a are identical to those described above, with the exception that connector parts, e.g., 24c' and 4c", which are shown in FIG. 4, can pivot up to 90 with respect to each other to conform to the shape of the corner of the automobile body (shown in phantom line in FIG. 1). FIG. 4 is a top view of a T-shaped connector 24c located in the corner of the automobile body. As has been mentioned above, due to a provision of flexible strap 26e, connector parts 24b' and 24b" described with reference to FIGS. 2 and 3, can be turned with respect to each other by about 90° to a position of FIG. 4 without disengagement from each other.

FIG. 5 is a front view of the T-shaped connector in an open state and prior to assembly with frame 20. It is shown that the connector, which may be, e.g., connector 24b, has projections 39a, 39b, 39c, and 39d, which are formed on the edge of the connector.

Figure 7:
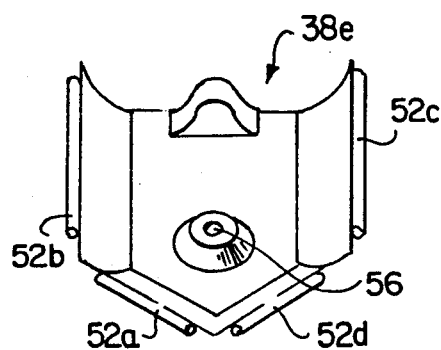
FIG. 7 is a perspective view of a foot for the vertical column.
Figure 8:
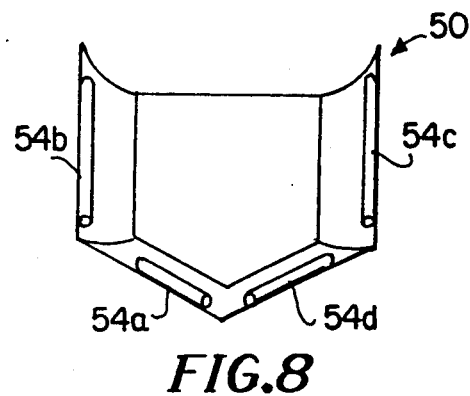
FIG. 8 is a perspective view of a cover for the foot.

For protective and decorative purposes, each T-shaped connector is closed with a respective cover 41 which is shown in FIG. 6. Cover 41 has the same configuration as the T-shaped connector itself and has snap-in edges 41a, 41b, 41c, and 41d which snap in respective projections 39a through 39h of the connector. Each connector part 24b' and 24b" has on its rear side recesses 43' and 43" (FIG. 5) which form on the opposite side projecting portions 45 and 47 (FIG. 5) with respective holes 46 and 48 through the wall of the connector. As will be explained further, recesses 43' and 43" and holes 46 and 48 serve for attachment of a pulley. FIG. 7 is a perspective view of a foot, e.g., foot 38e and FIG. 8 is a perspective view of a foot cover 50. Foot 38e has on its sides inner projections 52a through 52c which are designed for engagement with snap-on edges 54a through 54c of foot cover 50. Recesses (not shown) and holes 56 similar to those described with reference to the connector are formed also in each foot 38a through 38f for attachment of pulleys located in the foot portion of the frame, as will be described later.

FIGS. 2–8. Description of Cord-Guiding and Window-Shade Attachment Mechanisms As has been described above, frame 20 and all vertical columns 22a through 22f are made of hollow tubular elements, the interior of which houses an endless cord 42 which is guided over a plurality of pulleys. Since a portion of the cord-guiding mechanism located in each T-shaped connector and its respective vertical column and foot is identical and consists of three pulleys, only one portion of the cord-guiding mechanism which is located in connector 24b, column 22e, and foot 38e will be described and considered with reference to FIG. 2.

Inserted into holes 46, 48, and 56 are threaded studs 58, 60, and 62. Studs 58 and 60 are fixed in connector parts 24b' and 24b'' by means of nuts 66 which are placed into above-mentioned recesses 43' and 43'' (FIG. 4). Stud 62 is fixed in foot 38e also by means of a nut located in the same recess (not shown). Smooth portions of studs 58, 60, and 62 support pulleys 64, 66, and 68, respectively. The pulleys 58, 60, and 62 can freely pivot on their studs and are fixed against displacement in the axial direction of the studs, e.g., by means of lock rings 70, 72, and 74.

Guided over pulleys 64, 66, and 68 is an endless cord 42 which, as has been mentioned above, passes through the entire system formed by the hollow tubular frame 20. In other words, only a portion of cord 42 is shown in FIG. 2.

A first pulley 64 and a second pulley 66 are rotatingly installed inside each of the above-mentioned T-shaped connectors and a third pulley 68 is rotatingly installed inside a respective vertical element which is inserted into each respective T-shaped connector. Third pulley 68 is located below the above-mentioned lower side of the window (not shown). Cord 42 is guided over pulleys 64, 66, and 68 so that it forms two vertical runs 42a and 42b inside the vertical element (22e in FIG. 2).

Figure 9:
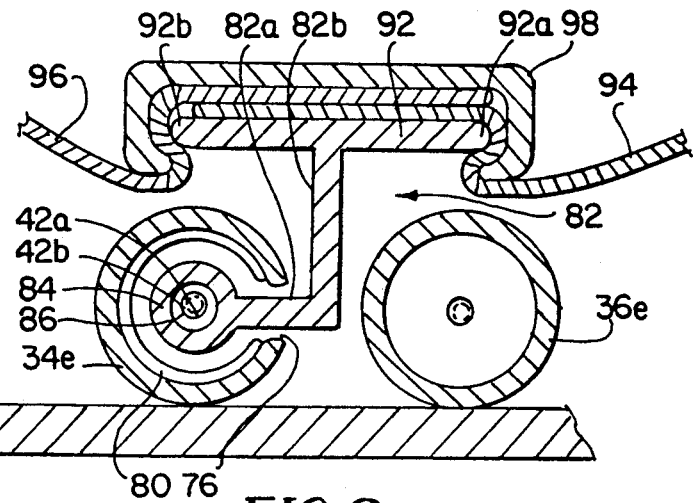
FIG. 9 is a transverse sectional view taken along the line IX—IX of FIG. 2.

One tube of each column has a longitudinal slot which passes through the entire length of the column. Since all such slots and mechanisms associated therewith are identical, only one of them will be described and shown with reference to FIG. 9 which relates to column 22e. As shown in FIG. 9, tube 34e has a longitudinal slot 76 which is formed on the side of tube 34e facing tube 36e. A vertical slot 11 is formed between tubes 34e and 36e. Inserted into tube 34e is a C-shaped spring 80 which tends to expand radially outwardly so that it radially expands tube 34e and thus increases longitudinal slot 76.

FIG. 9 is a sectional view taken in the direction indicated by line IX—IX of FIG. 2. As shown in FIG. 9, inserted into tube 34e is an L-shaped element 82 which has an inner leg 82a inside tube 34e and an outer leg 82b outside tube 34e. Outer leg 82b projects outward from gap 78 toward the interior of the automobile. Inner leg 82a terminates in a cylindrical yoke with a hole 86. Above-mentioned cord 42 freely passes through hole 86.

FIG. 2 shows cord 42 automobile stop elements 88 and 90. Each stop element 88 and 90 is rigidly attached to cord 42, e.g., by crimping so that paths of movement of stop elements 88 and 90 during shading and unshading of the windows intersect the yoke.

Stop element 88 is located above yoke 84 and stop element 90 is located below yoke 84. The length of cord 42 between stop elements 88 and 90 corresponds to the height of a window (not shown) along which vertical column 22e extends.

As shown in FIG. 9, outer leg 82b terminates in a flat pad 92 with rounded edges 92a and 92b. The sides of window shades 94 and 96, which are intended for shading adjacent windows (not shown) of the automobile, are laid one onto another in an overlapping manner as shown in FIG. 9. Shades 94 and 96 are fixed in the overlapped position by a snap-on cover 98 which has a U-shaped cross-sectional configuration and snaps-on on rounded edges 92a and 92b of pad 90 when cover 98 is pressed down.

Thus, each yoke, e.g., yoke 84 interacts with a pair of stops, e.g., stops 88 and 90, which are attached to one run of cord 42, e.g., run 42a.

The structure of L-shaped elements and mechanisms of attachment and fixation of shades are identical between each pair of adjacent windows.

Figure 10:
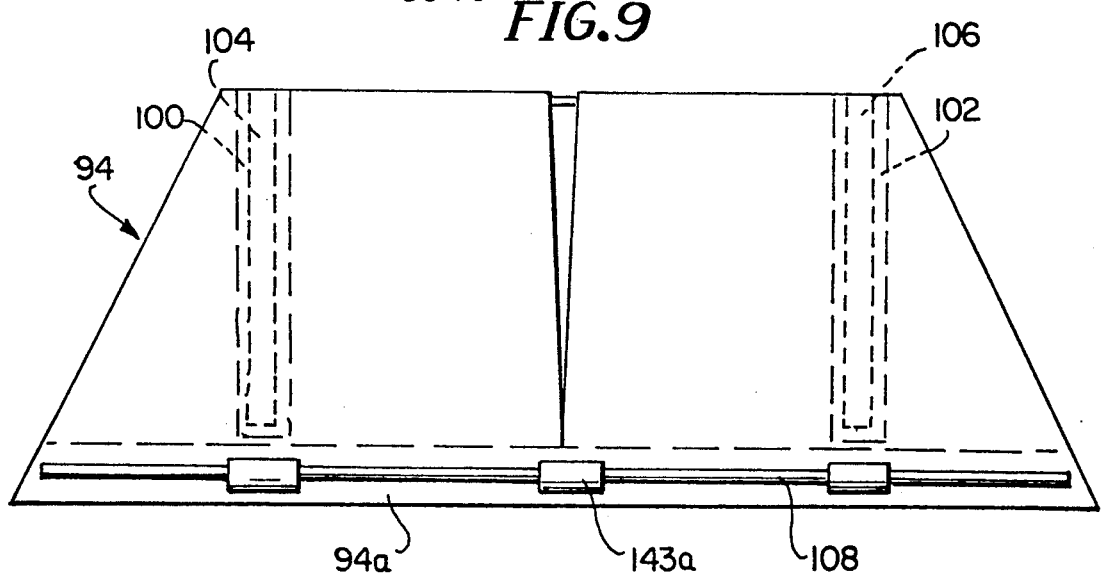
FIG. 10 is a view of a shade of the system in a window-closing position.

FIG. 10 is a view of one of the shades, e.g., shade 94 in an unfolded position. Shade 94 is shown in a trapezoidal form assuming that a respective window has the same configuration. In any case, the shape of the shade should correspond to the shape of a respective window to be shielded by this shade.

Shade 94 has vertical pockets which are located symmetrically and closer to respective sides of the shade. Inserted into pockets 100 and 102 are flat spiral compression springs 104 and 106, respectively. Each spring, which has the shape of a clock spring, tends to compress to a smaller diameter and to assume its initial compressed position.

A lower edge 94a of shade 94 has a rubber cord 108 which tends to compress the shade in the horizontal direction.

Figure 11:
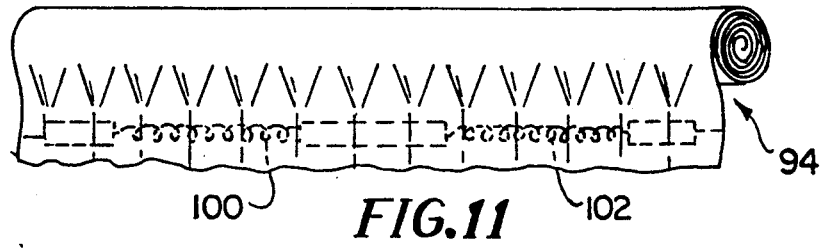
FIG. 11 is a view of the shade of FIG. 10 when the window is unshaded.

When shade 94 is pulled down to the window shading position, it has a configuration of the type shown in FIG. 10, and when it is lifted for unshading the window, springs 104 and 106 wind the shade into a roll as shown in FIG. 11.

In a position convenient for a driver to shade or unshield the windows, the system has a handle 110. In FIG. 1 handle 110 is shown on the left side of the driver's seat, although the handle can be located in any place along the path of cord 42.

Handle 110 is rigidly attached to cord 42, e.g., by clamping or crimping. An example of a handle and its attachment to cord 42 are shown in FIG. 12 which is a sectional view of FIG. 1.

Figure 12:
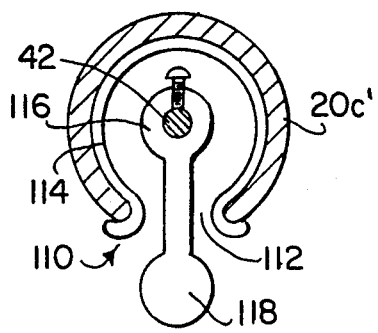
FIG. 12 is a sectional view taken in the direction indicated by line XII—XII of FIG. 1.

As shown in FIG. 12, horizontal tubular element 20c' has a longitudinal slot 112 located on the lower side of the tube. Similar to vertical tubular element 34e, horizontal tubular element 20c' is constantly expanded radially outwardly by a C-shaped spring 114. A yoke part 116 of handle 110 is crimped on cord 42, while a grip portion 118 projects through slot 112 inward and faces downward.

Handle 110 may have at its both sides spherical projections 120 and 122, while two respective snap-in locks 124 and 126 are provided in the positions corresponding to the ends of the stroke of handle 110, so that handle 110 can be fixed in the leftward position (shades closed) or in the rightward position (shades open).

For complete shading of all windows, the length of the stroke of handle 110 between locks 124 and 126 must be equal to or greater than the height of the largest window. First stop 88 (FIG. 2) is located at some distance above yoke 84, while second stop 90 is located at some distance under yoke 84. Thus for any of the windows, except for the largest one, the distance between first stop 88 and second stop 90 is equal to the difference in height between the largest window and the other windows, plus the length of the respective yoke. (For the largest window, stops 88 and 90 are located directly above and under yoke 84) length of the stroke of handle 110 between locks 124 and 126

FIGS. 1 through 11. Operation

In the initial position of shades, when the windows are unshielded, each shade is wound in a roll under effect of their respective springs 100 and 102, as shown in FIG. 11.

When a driver wants to shield the automobile windows, e.g., when an automobile is parked in a sunny place, the driver pulls handle 110 in the window-shading direction, e.g., in the direction of an arrow A in FIG. 1. As handle 110 moves in the direction of arrow A, it pulls cord 42 to the right, and, hence, all shades 94 and 96 are moved down. As has been mentioned above, only two shades 94 and 96 are shown. It is understood, however, that shades of all windows are identically connected to endless cord 42, so that movement of the cord is accompanied by simultaneous movement of all shades in the window-shading direction, i.e., in the downward direction shown by an arrow B in FIG. 1.

In the course of its movement, cord 42 is guided over respective pulleys. In vertical column 22e, cord 42 is guided over pulleys 64, 66, and 68. Stop element 88, which is rigidly attached to cord 42, also is moved in the rightward direction. During its movement, stop 88 comes into contact with yoke 84 and pushes it downward. As yoke 84 is connected to shades 94 and 96, the latter will be pulled down.

For the smallest window of the automobile, the positions of stops 88 and 90 are adjusted so that a distance between them equals the difference in the heights of the largest and the smallest window plus the length of the yoke. The same principle is used for positioning respective stops on a window of any size, i.e., the distance between the stops for any window is equal to a difference in heights between this particular window and the largest one plus the length of the yoke. On the largest window, the stops are located directly above and below a respective yoke.

While shades 94 and 96 are pulled down, the driver's hand overcomes the resistance of springs 104 and 106 which are unwound when yoke 84 is pushed down by stop 88.

It may be a situation on a small window at which stop 88 did not yet reach yoke 84, while stop 90 already moved down from yoke 84. In this position, the system consisting of yoke 84 and shades 94 and 96 will be held in place by the resilient forces springs 104 and 106.

As handle 110 reaches its extreme right position, which corresponds to complete shading of the automobile window, projection 122 is snapped-in by lock 126. Now all windows of the automobile are shielded with the shades.

When the shades are moved back to the unshielded position of the windows, the operations are repeated in a reverse order, i.e., handle 110 is moved to the left in the direction opposite to arrow A, projection 122 is released from lock 126, stops 90 and 88 move upward in the direction opposite to arrow B, stop 90 pushes yoke 84 and shades 94 and 96 upward, and the shades unshield the window.

As handle 110 reaches its extreme left position, which corresponds to complete unshading of the automobile window, projection 120 is snapped-in by lock 124. Now all windows of the automobile are unshielded.

The shade can be made of a flexible, light-resistant, and light-impermeable material, such as natural or synthetic fabric.

Figure 13:
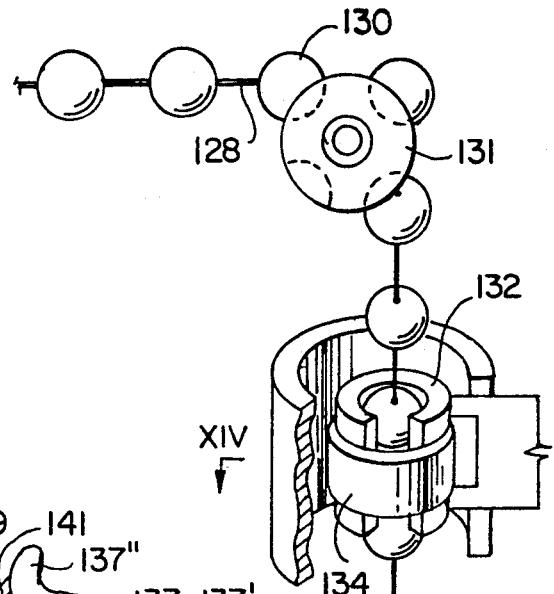
FIG. 13 is a perspective view of a portion of an endless flexible element in accordance with a second embodiment of the invention.
Figure 14:
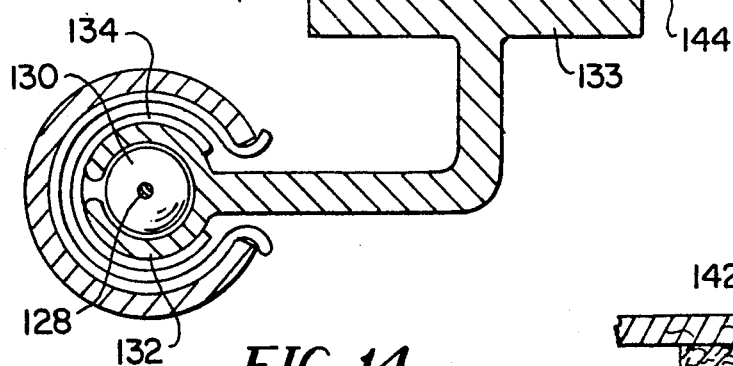
FIG. 14 is a transverse sectional view taken in the direction indicated by line XIV—XIV of FIG. 13.
Figure 15:
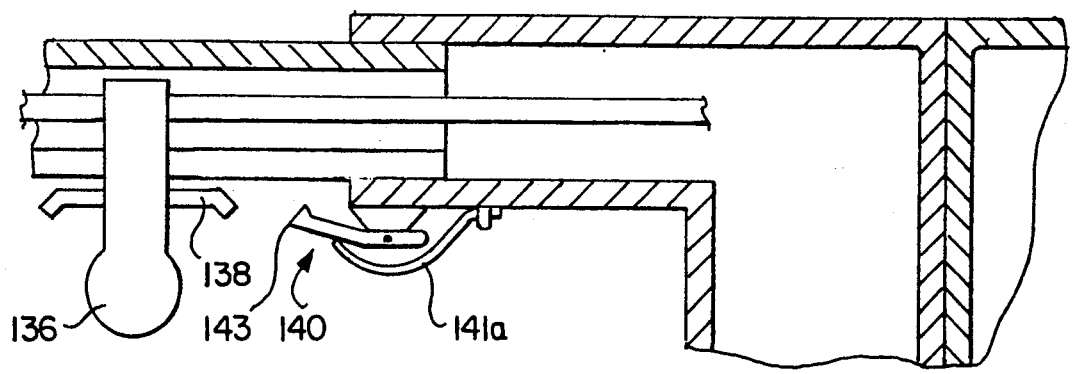
FIG. 15 is a sectional view of a positive lock for fixing the endless flexible element in place.

FIGS. 13-15—Embodiment with Beaded Endless Flexible Element

FIG. 13 through 15 show another embodiment of the system of the invention which allows selective shading and unshading of various windows.

In general the system of this type is similar to that described above and therefore only those parts and elements which are different will be described. In the system of FIGS. 13 through 15, cord 42 is replaced by a flexible element composed of a thread 128 with beads 130. The system does not need stop elements, such as elements 88 and 90 of the previous embodiment. However, yoke 132 has a C-shaped cross-sectional configuration which is shown in FIG. 14. FIG. 14 is a sectional view of FIG. 13. The C-shaped portion of yoke 132 is embraced by a C-shaped spring 134 which makes the yoke resilient.

Beads 130 have diameters slightly exceeding the inner diameter of yoke 132.

In order to provide independent movement for all shades, each shade has an independent attachment to yoke 132. As shown in FIG. 14, foot 133 of yoke 132 supports edges of two adjacent shades 142 and 144. Shade 142 and 144 do not overlap each other but located with a gap to each other or in a butt-connection manner. Shades 142 and 144 are connected to foot 133 by means of spring-loaded clips 135 and 137. Each clip 135 and 137 comprises a two-arm lever. One arm 135' or 137' of each lever is pressed by a spring 139 or 141 to the edge of shade 142 or 144, respectively. Opposite arms 135" or 137" serve as handle for releasing the clamp.

Figure 14A:
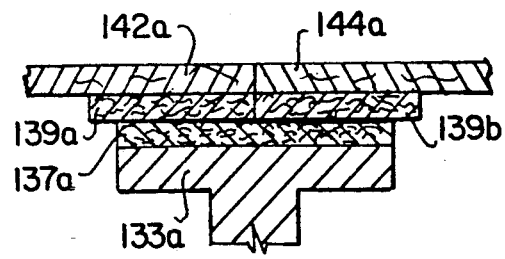
FIG. 14a is a sectional view of showing a hook-and-loop connection of the shades to a yoke in accordance with another embodiment of the invention.

FIG. 14A shows another version of the shade attachment mechanism. In this embodiment, foot 133 is coated with a dense arrangement of loops 137a, while edges of respective shades 142a and 144a have a dense arrangements of hooks 139a and 139b. When hooks 139a and 139b are pressed to loops 137a, they removably but firmly interlock with each other.

A layer of loops 146 is attached also to the outer surface of each foot cover 50 (FIG. 1 and FIG. 8).

For this purpose, handle 136 has a projection 138 while in the extreme position of the handle, frame 20 has a spring-loaded lock 140. Lock 140 comprises a two-arm lever which is spring-loaded by a spring 141a. One arm of the spring has a locking projection 143 which engages projection 138 of handle 136. This lock fixes handle 138, and hence endless beaded thread 128, in a locked position against any movement. On the other hand, yoke 132 can be moved with respect to thread 128 so that its C-shaped portion is expanded and passes over beads 130. Since yoke 132 is connected to shades 142 and 144, it will move shades 142 and 144 as well.

It is important for this embodiment that the force of holding beaded thread 128 immobile is greater than the force required for expanding C-shaped yoke 132 and passing it over the fixed thread.

Projection 138 and handle 136 can be released from lock 140 by pressing a spring-loaded lock 140.

The mechanism described above in connection with FIG. 15 makes it possible to lock beaded thread 128 and to move selective yokes along vertical columns 22a through 22f.

On its lower end, shades 142a (FIG. 14a) may have a load 143a which counterbalance the force of springs 104 and 106 (FIG. 10).

FIGS. 13–15—Operation of System with Beaded Flexible Element

When endless beaded thread 128 is pulled down or upward, beads, which have greater diameters than yoke 132, pull yoke 132 down or up until further movement of yoke 132 is arrested by a respective foot or T-shaped connector. When yoke 132 is stopped, e.g., on the smallest window, further application of a force to endless thread 128 from the driver's hand will pull beads 130 through C-shaped yoke 132 by expanding the inner diameter of the now immobile yoke. This will in turn allow beads 130 to pass through yoke 132 until other windows of larger size are completely shielded or unshielded.

When the entire system is in a shielded position and the flexible beaded thread 128 is locked by lock 140, and it is necessary to shield some of the windows, the driver or a passenger moves yoke 134 down along a respective vertical column. As yoke 134 move down along now immobile beaded thread 128, spring-loaded C-shaped yoke expands and pass sequentially over beads 130, as described above. When yoke 134 and a similar adjacent yoke (not shown) located on the left or on the right side from yoke 134 move, they pull the shades which are attached to them. As the forces of springs 104 and 106 are counterbalanced by loads 143a, shades 142a and 144a can be left in an arbitrary vertical position. It is understood that then a pair of adjacent yokes is moved down, they pull down in a plane-parallel motion a respective shade which is located between these yokes. At the same time, this yoke will pull shades located on the sides of the central shade in an inclined manner. This is because the opposite ends of side shades are fixed and connected to other now stationary yokes. Partial shading may be used instead of a sun-protective visor on the windshield and side windows of the automobile.

In case it is necessary to shield only one window, while the others remain unshielded, it is necessary to disconnect hooks 139a and respective hooks on the other side (not shown) of shades, e.g., shade 142a from loops 137a and respective loops (not shown) on the other side of this shade. As a result, the lower end of shade 142a will be released from the yokes. Now the lower end of shade 142a can be pulled down by unwinding shade 142a. As counterweight 143a counterbalance the force of springs 104 and 106, shade 142a will remain in the installed position. If necessary, hooks 139a and hooks on the other side of shade 142a can be attached to respective loops 146 on cover 50 and to loops on the cover on the other side of the shade, so that shade 142a will be fixed in the adjusted shielded position, while other shades will remain unshielded.

Figure 16:
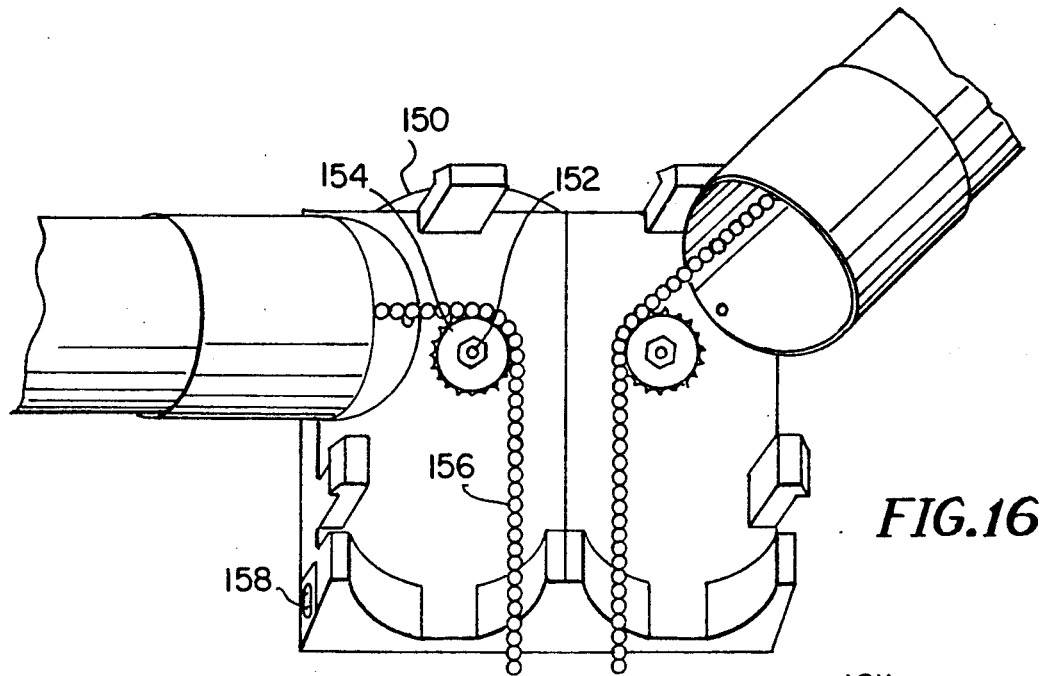
FIG. 16 is a diagrammatic view of an embodiment employing a motor drive.
Figure 16A:
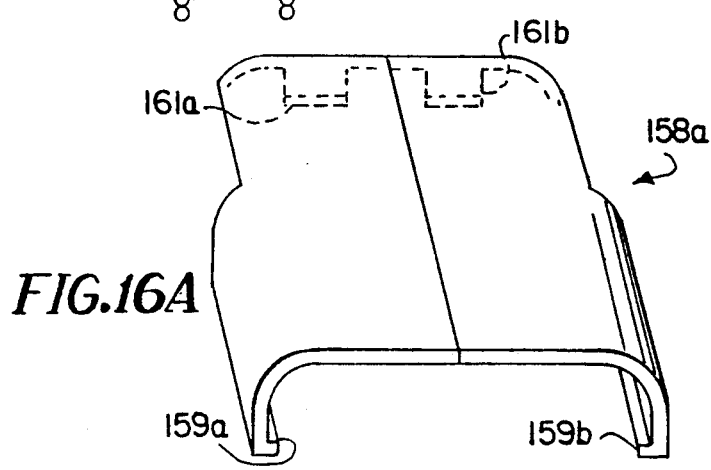
FIG. 16a is a perspective view of a cover for a connector used in the embodiment of FIG. 16.

FIG. 16—System with a Drive Motor

Instead of manually pulling the shades, the system may be provided with a drive motor, such as a reversible electric motor 150 shown in FIG. 16. FIG. 16 is a fragmental sectional view of the cord-guiding system in the ares of a T-shaped connector. An output shaft 152 of motor 150 is rigidly connected to one of cord guiding elements which in the illustrated case is made in the form of a sprocket 154. A portion of cord 42a which is guided over sprocket 154 comprises a roller chain 156 which in mesh with sprocket 154. Roller chain 156 has a length equal to or slightly greater than the height of the largest window (not shown). A motor-starting pushbutton 158 may be located in any place convenient for the driver or a passenger to push this button. The rest of the system remains absolutely the same as the one described earlier.

The connector of FIG. 16 is protected by a cover 158a which has snap-in edges 159a, 159b, 161a, and 161b.

FIG. 16—Operation of the Motor-Driven Window-Shading System

The motor-driven system operates in the same manner as the manually-driven system described above with the exception that instead of pulling handle 136, the driver or a passenger presses pushbutton 158 which energizes motor 150. Rotation of motor 150 drives sprocket 154 which moves endless flexible element 156 together with the shades in a required direction. Since the motor is reversible, second pressing on pushbutton 158 will reverse the motor and moves the shades in the opposite direction.

Figure 17:
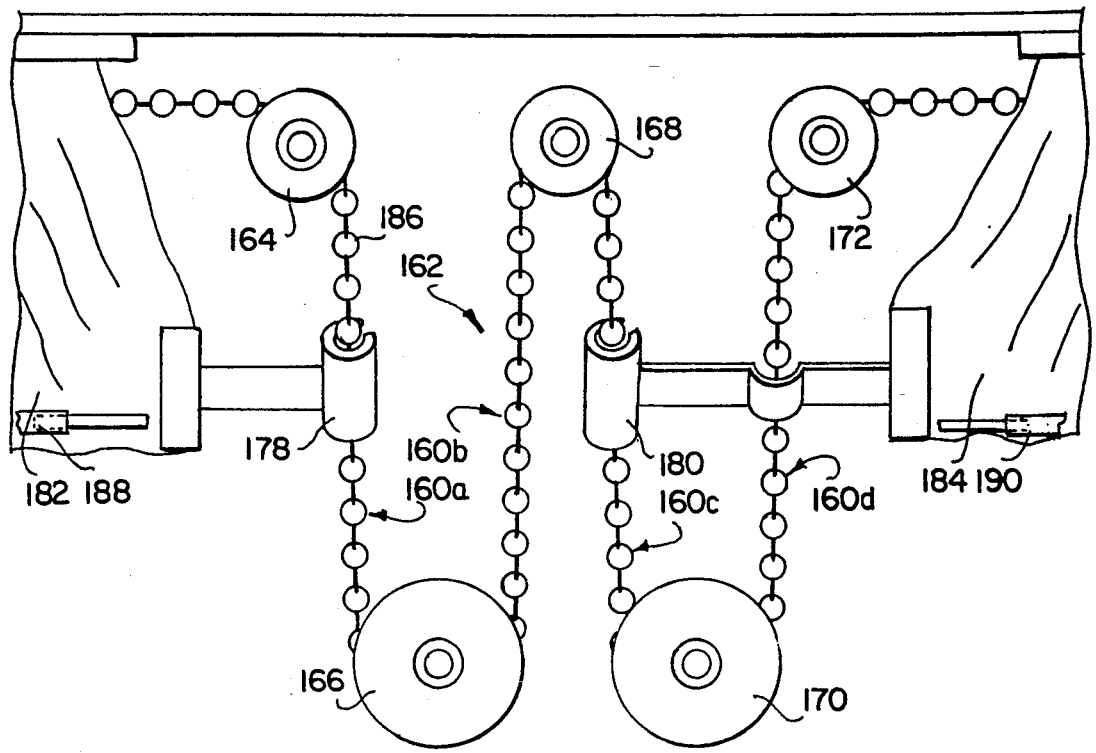
FIG. 17 is a diagrammatic view of an embodiment using an independent yoke on each side edge of the shade.

FIG. 17. Embodiment of the System with Yokes Separated at the Side Edges of the Shades In the embodiment of the system shown in FIG. 13, separate movement of selected shades was allowed due to separation of edges of adjacent shades by providing separate clips 135 and 137 for edges of adjacent shades 142a and 144a. This is necessary for separate movement of the selected shade, so that shade 142a could move independently of shade 144a. The same objective can be achieved by utilizing a system shown in FIG. 17.

FIG. 17 is a schematic side view of another independent-shade-movement system for guiding a beaded cord through a T-shaped connector and a vertical column.

The system of FIG. 17 contains four parallel runs 160a, 160b, 160c, and 160d of a beaded thread 162 which is guide over five pulleys 164, 166, 168, 170, and 172. Three of these pulleys, i.e., 164, 168, and 172 are located in a T-shaped connector 174, while two other pulleys, i.e., 166 and 170, are located in the lower part of a vertical column. Two yokes 178 and 180 are located inside vertical column 176. Yoke 178 is connected to the side edge of a shade 182 while yoke 180 is connected to the side edge of shade 184. Yokes 178 and 180 each have the same C-shaded portion (not shown) as one shown and described with reference to FIG. 16 so that each yoke 178 and 180 may slide over beads 186 of beaded thread 162 when the latter is fixed against movement by any suitable locking mechanism (not shown). This may be the same mechanism as the one shown in FIG. 15. Yoke 178 engages run 160aand yoke 180 engages run 160c.

Each shade may have on its lower side a rigid tube, i.e., shade 182 has a tube 188 and shade 184 has a tube 190. Since shades may have a trapezoidal form conforming the shape of an automobile window, each tube 188 and 190 may have a telescopic structure for variation of its length.

Similar to shades of the previous embodiment, shades 182 and 184 also have pockets and springs (not shown in FIG. 17).

It is understood that the left side of shade 182 and the right side of shade 184 have the same attachment mechanisms as those shown in FIG. 17.

FIG. 17—Operation of the System with Separated Yokes

The system of FIG. 17 operates in the same manner as the system of FIGS. 13 and 14 with the exception that instead of releasing the selected shade by using clips 135 and 137, the driver or a passenger does not to release any clips or shade holding mechanism, provided that beaded thread 162 is locked against movement. For example, if it is necessary to unshield only shade 182, the driver or a passenger should push tube 188 up and the springs (not shown) will assist in winding the shade up. In case it is necessary to shield the windows, the driver or a passenger should pull tube 188 down.

Figure 18:
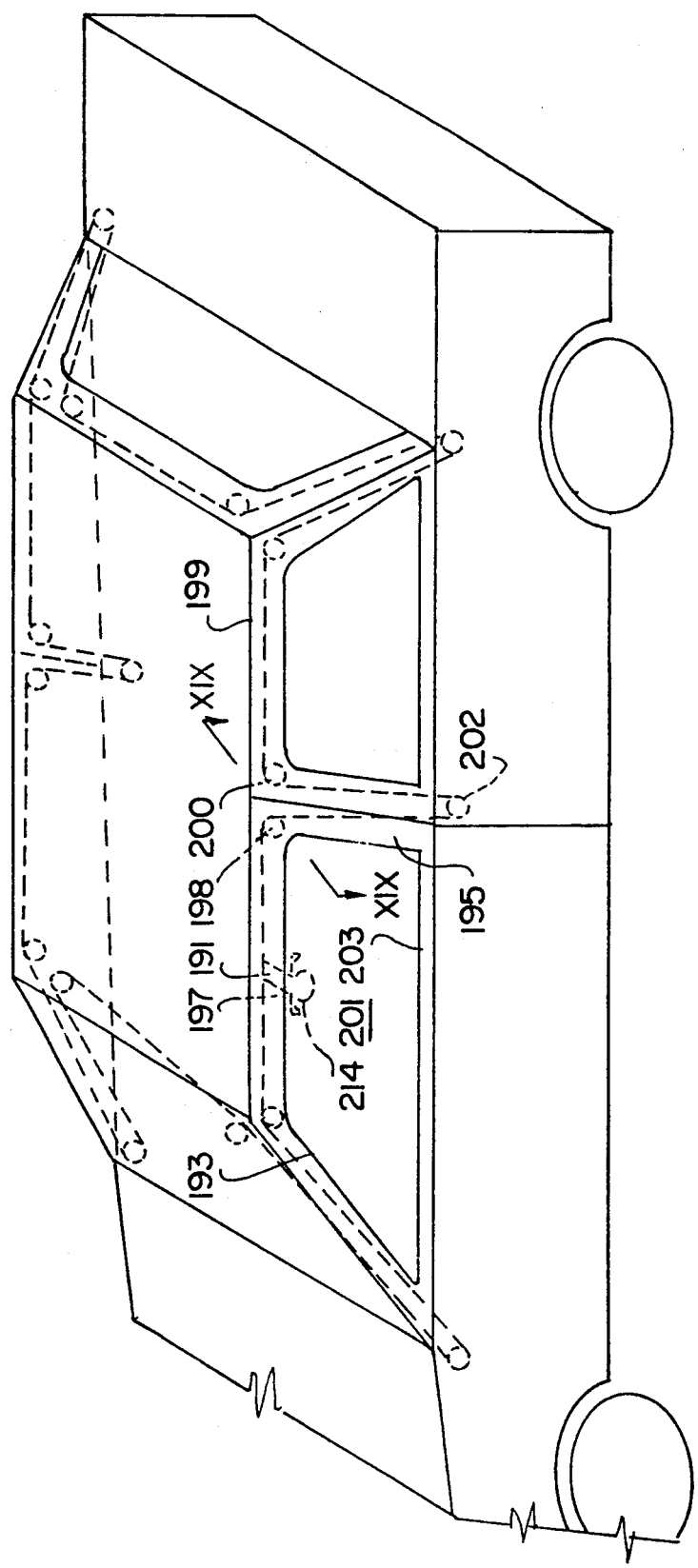
FIG. 18 is a schematic perspective view of the shading system of the invention showing how it is attached directly to the outer surfaces of facing panels of an automobile's interior.

FIG. 18—Automobile Window Shading System Attached Directly to Facing Panels of the Automobile Interior The system of the invention may be embodied without the use of frame 20 shown in all previous embodiments.

The window shading system which is attached directly to outer surfaces of facing panels of the automobile interior is shown schematically in FIG. 18. FIG. 19 is a sectional view of FIG. 18.

The system of this embodiment is the same as those described above, with the exception that studs 192, 194, and 196 which support pulleys 198, 200, and 202, respectively (which correspond to pulleys 64, 66, and 68 of FIG. 2) are attached directly to a facing panel 204 of the automobile interior. Pulleys 198 and 200 are located above the level of upper sides 197, 199, etc. of window 201, etc., while pulley 202 is located below the level of a lower side 203, etc., of windows 201, etc.

An endless cord 191 is guided over pulleys 198, 200, 202, etc., outside vertical sides 193, 195, etc., and upper sides 197 and 199, etc., of the automobile windows 201, etc.

A yoke 206 has the same L-shaped configuration as yoke 82 of FIG. 9. It also has a pad 208 which supports shades 210 and 212. The shade may be fixed to pad 208 by any method described above, e.g., by clamps or by a hook-and-loop connection (not shown).

As shown in FIG. 18, the system has a handle 214 which is attached to a cord 191. The latter is guided in an endless manner over a system of pulleys 198, 200, 202, etc. The remaining elements, i.e., the stops, locks, etc., are the same as described above.

The system operates in the same manner as the window shading system of FIGS. 1 to 17 and therefore description of its operation is omitted.

Figure 19A:
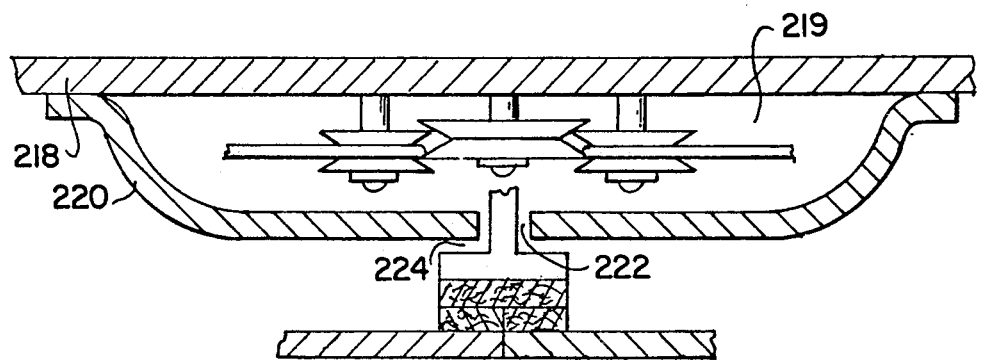
FIG. 19a is a sectional view similar to FIG. 19 for the case where the cord-guiding system is located under the facing panels of the automobile's interior.
Figure 19:
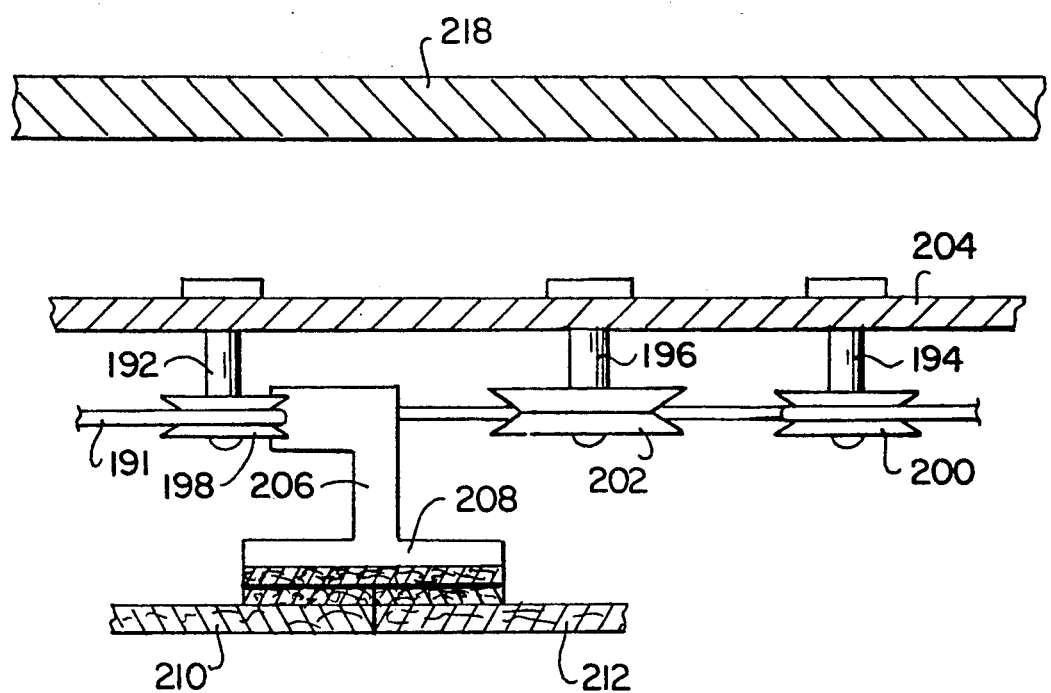
FIG. 19 is a sectional view taken along the line XVIII—XVIII of FIG. 18.

FIG. 19a—Window-Shading System Hidden Beneath the Facing Panels

The window-shading system of the invention may be hidden under the facing panels of the automobile interior. FIG. 19a is a sectional view similar to FIG. 19 for the case where the cord-guiding system is located under the facing panels of the automobile interior.

This system differs from the one shown in FIGS. 19 in that it is located in a space 219 between an automobile body 218 and facing panels, such as a facing panel 220 of the automobile interior. In this case, appropriate slots, such as a slot 222, must be formed in facing panel 220 for passing an L-shaped element 224 of a yoke 226. The remaining details of the system and its operation are the same and therefore their description is omitted.

SUMMARY, RAMIFICATIONS, SCOPE

Thus, it has been shown that I have provided an automobile window shade system which protects the entire automobile interior from direct sunlight, which makes it possible to shield and unshield all automobile windows simultaneously by one movement, which is adjustable in a vertical direction, which is durable and have long service life, and which is capable of selectively shading or unshading separate automobile windows.

Although the automobile window shading system has been shown and described in the form of specific embodiments, these embodiments, their parts, materials, and configurations have been given only as examples, and that other modifications of the system are possible. For example, the shading system may be used not necessarily in an automobile but in a room of a house. The number of horizontal and tubular sections and the number of shields may be different. The handle may be located both on horizontal and on vertical elements. Shades may be connected to yokes by buttons or other fasteners. Shades may be made of fabric or may consists of a plurality parallel horizontal plates interconnected by flexible elements. A chain and sprockets can be used instead of a cord and pulleys. The system for guiding an endless flexible element may have a path different from that shown and described above and may have more than three pulleys within the T-shaped connector and inside each column. The connectors themselves may have configurations other than those shown in the drawings. Although the system is shown located inside a tubular frame which is attached to the automobile body, it may be incorporated under the cover plates of the interior of the salon, or may be attached to the outer surfaces of the cover plates of the salon interior. The shades of the windshield may have a cutout for a rearview mirror or may have any other configuration convenient for the automobile interior.

Therefore, the scope of the invention should be determined, not by the example given, but by the appended claims an their legal equivalents.

What we claim is:

1. A window shade system for an automobile having a body with windows, each of said windows having a periphery, comprising:
   at least one endless flexible element,
   a plurality of guide elements for guiding said one flexible element along the peripheries of said windows,
   a plurality of shading elements attached to said one flexible element so that they can be moved together with said one flexible element with respect to said windows between (a) a window shading position, and (b) a window unshading position;
   means on said one flexible element for moving said plurality of shading elements; and
   means attaching said plurality of guide elements to said body;
   said means for moving said shading means comprising at least one yoke connected to said shading means and first and second stops both connected to said one flexible element;
   said stops having paths of movement which intersect said at least on yoke, said first stop being located above said one yoke, said second stop being located below said one yoke.

2. The system of claim 1, further including a hollow frame for installation inside said body, said hollow frame being composed of a plurality of horizontal elements and a plurality of vertical elements, said plurality of horizontal elements and said plurality of vertical elements being interconnected through a plurality of connectors, said flexible element moving within aid hollow frame so as to form a moveable part of said system; said hollow frame and said body forming a stationary part of said system.

3. The system of claim 2 wherein one of said windows has a greater height than another of said windows, said first stop being located above said one yoke and said second stop being located under said one yoke so that, for said another windows the distance between a first stop and a second stop of said another window is equal to the difference in height between said one window and said another window plus the length of said one yoke.

4. The system of claim 3 wherein said guides elements comprise first, second and third pulleys, said first and second pulleys being rotationally installed inside each of said connectors, said third pulley being rotationally installed inside each of said vertical elements, said vertical element being inserted into one of said connectors, said third pulley being located below a lower side of said windows, said flexible element being a flexible cord which is sequentially guided over said first, second, and third pulleys, so that it forms a first vertical run and a second vertical run inside each of said vertical elements, said one yoke engaging said stops attached to said cord of said first vertical run, said stops having dimensions which allow the passage of said stops over said pulleys and do not allow the passage of said stops through said one yoke.

5. The system of claim 4 wherein each of said shading means is connected to at least one of said yokes in adjacent vertical elements.

6. The system of claim 5 wherein each of said connectors has first and second parts which can be turned with respect to each other for about 90° around their vertical axes so that a connection can be made between a shading element of a side window and a shading element of a rear or front window.

7. The system of claim 6 wherein each of said vertical elements comprises two parallel tubular elements with said first run of said cord being located in one of said tubular elements and with said second run of said cord being located in another of said tubular elements, said one of said tubular elements having a longitudinal slot, said one yoke having an L-shaped configuration with one leg being located inside said one tubular element and passing through said slot, while another leg of said one yoke extends outside said one tubular element and is connected to sides of two adjacent shading elements.

8. The system of claim 7 wherein said shading elements have sides and are made of a flexible, light-impermeable material and have plurality of resilient elements attached to said sides of shading elements, said resilient elements constantly tending to urge said shading elements up, said first part and said second part of each of said connectors being connected by a flexible band.

* * * * *

UNITED STATES PATENT AND TRADEMARK OFFICE
CERTIFICATE OF CORRECTION

PATENT NO. : 5,316,363
DATED : May 31, 1994
INVENTOR(S) : Adolf Tyutinman

It is certified that error appears in the above-indentified patent and that said Letters Patent is hereby corrected as shown below:

Col. 4, line 25, change "90" to —90°—.

Col. 6, lines 67-68, delete "length of the stroke of handle 110 between locks 124 and 126".

Col 12, line 59, change "on" to —one—.

Signed and Sealed this

Sixteenth Day of August, 1994

Attest:

BRUCE LEHMAN

Attesting Officer     Commissioner of Patents and Trademarks